2 Sheets—Sheet 1.
J. KING.
Wood-Working Tools.
No. 218,184. Patented Aug. 5, 1879.
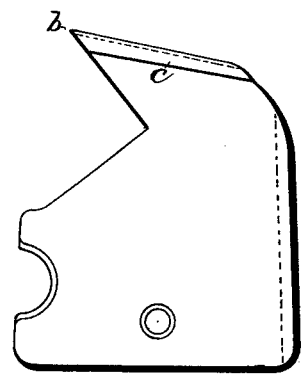
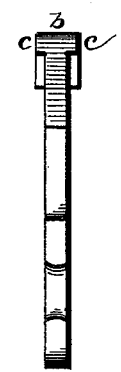
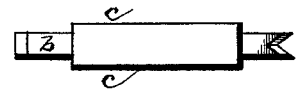
WITNESSES
E. J. Nottingham
A. Scott
INVENTOR
Jesse King
By Leggett & Leggett
ATTORNEYS
N. PETERS, PHOTO-LITHOGRAPHER, WASHINGTON, D. C.

J. KING.
Wood-Working Tools.
No. 218,184. Patented Aug. 5, 1879.
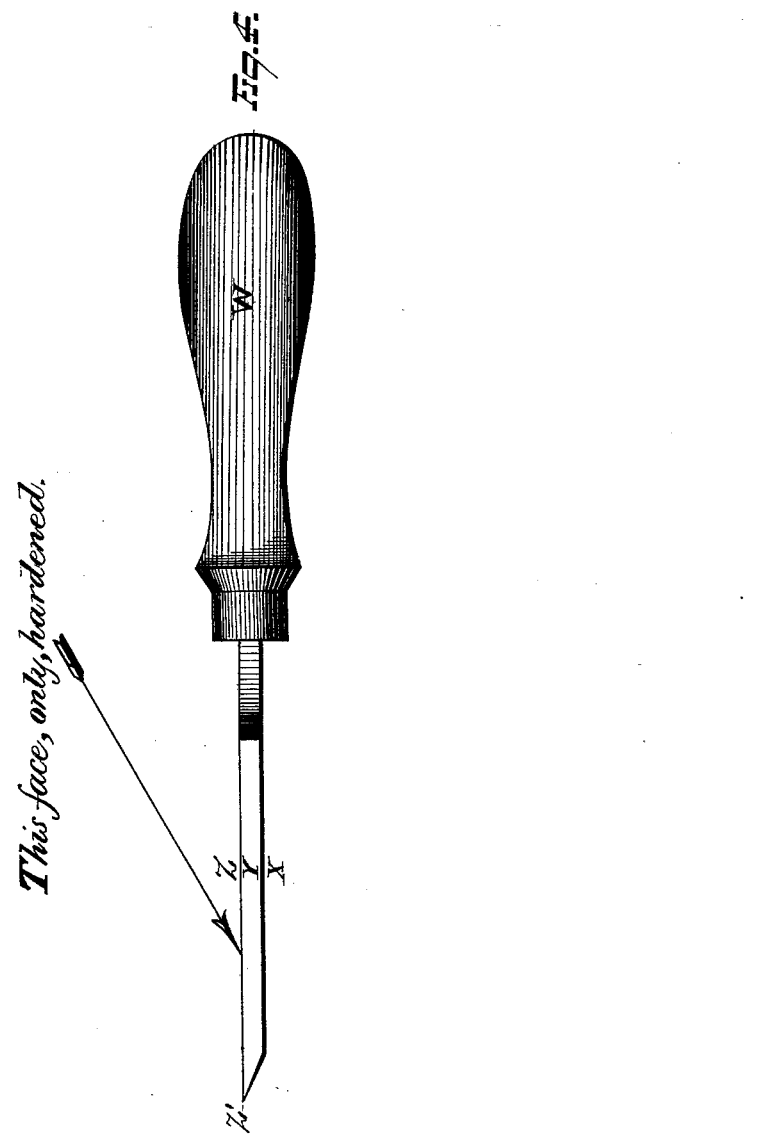
WITNESSES
INVENTOR
Jesse King
By Leggett & Leggett ATTORNEYS.

UNITED STATES PATENT OFFICE.

JESSE KING, OF OSWEGO, NEW YORK.

IMPROVEMENT IN WOOD-WORKING TOOLS.

Specification forming part of Letters Patent No. 218,184, dated August 5, 1879; application filed June 27, 1878.

*To all whom it may concern:*

Be it known that I, JESSE KING, of Oswego, in the county of Oswego and State of New York, have invented a new and improved method of making self-sharpening cutting tools or edges, such as mower and reaper teeth, saw-teeth, planer-knives, chisels, &c.; and I do hereby declare the following to be a full, clear, and exact description of the invention, such as will enable others skilled in the art to which this invention pertains to make and use it, reference being had to the accompanying drawings, which form part of this specification.

My invention relates to edged tools, such as saw-teeth, planer-knives, chisels, &c.; and it consists in such an implement having its cutting-edge formed in the manner hereinafter specified.

In the drawings, Figures 1, 2, and 3 represent a removable saw-tooth in side and edge elevations. Fig. 4 shows a chisel, by which my said invention may be explained.

Heretofore there have been, to my knowledge, but three ordinary ways of making edged implements—one by forming them of all steel or equivalent substance; another by making them first of, say, soft iron, and then converting the edge end into steel. Such a process is described in United States Patent No. 82,607, granted September 29, 1868, to F. C. Curie. The third method consisted in originally forming the tool from soft iron, and then case-hardening its entire outside crust or surface.

The difficulties and objections frequently attending the use of tools made after these methods are briefly these: When made of solid steel, in order to be kept sharp frequent grinding is required; and with many implements it is necessary to "draw the temper," then sharpen, and then retemper. This, especially in unskilled hands, is attended with great risk to the implement, and it is always laborious and troublesome.

In the second case, when the tool is made of part steel and part iron, these same objections are met; and in the third instance, where the tool is simply case-hardened, it is worthless until re-case-hardened, when the hard shell is worn through.

Now, my invention seeks not only to obviate these difficulties and objections, but I also produce an implement cheap of construction and self-sharpening.

I form the tool originally of soft iron, and when it is properly shaped I harden only one of the surfaces that terminate in the cutting-edge.

As there are many known ways of converting soft iron into steel, or into a tough, hard condition equivalent to steel, so far as edged tools are concerned, I do not limit myself to any definite process for hardening this single surface of my implements, as above referred to. Such a method as set forth in United States Patent No. 65,892, granted June 18, 1867, to Wm. G. Esser, would probably serve a useful purpose in this respect.

To more particularly explain my invention, I will refer to Fig. 4 of the drawings. Here is shown a chisel, with its handle W and body Y. The body Y is originally formed from soft iron. I now harden only the surface Z, which terminates in the cutting-edge Z', leaving the body Y and the sides and opposite face X soft iron. The face Z now consists of a very thin and very tough, hard film of only the thickness of a cutting-edge, so that when beveled at the end, as shown, the end exposure of this hard film Z will constitute a cutting-edge.

Now, as the tool is used the soft iron will wear away, and the upper film, Z, will always afford a sufficient edge, and thus the tool is self-sharpening.

It is apparent that none of the former three methods that I have mentioned could produce the results attained by my invention. I therefore do not lay any claim to any edged tool made of all steel, or one having both sides of its cutting-edge of steel or equivalently hard metal, nor do I claim either of the inventions set forth in the said Curie or Esser patents; but What I do claim is—

An edged tool having only one surface of its body, which terminates in the cutting-edge, converted into steel, or equivalently hard, tough metal, to a depth corresponding to the thickness of a cutting-edge, the entire remaining surfaces and body of said tool being of soft iron, substantially as and for the purpose shown.

JESSE KING.

Witnesses:
 B. B. BURT,
 C. C. WENTWORTH.